Oct. 10, 1961  R. FENNEMA  3,003,744
BACKSEATING CONSTRUCTION
Filed Aug. 21, 1958

Inventor:
Richard Fennema.
By Joseph O. Lange
Atty.

United States Patent Office 3,003,744
Patented Oct. 10, 1961

3,003,744
BACKSEATING CONSTRUCTION
Richard Fennema, Chicago, Ill., assignor to Crane Co., Chicago, Ill., a corporation of Illinois
Filed Aug. 21, 1958, Ser. No. 756,461
7 Claims. (Cl. 251—330)

This invention relates generally to improvements in valves and more particularly it is concerned with a novel form of what is termed by those skilled in the art as a backseating construction which device becomes effective when the valve is in the closed position.

In order to obtain a better appreciation of the background of this invention, it should be understood at the outset that in connection with valves, particularly where wedge gate valves are employed or where considerable wear occurs in the seating closure mechanism depending on severity of pressures and temperature conditions encountered, it is desirable that a backseating arrangement be provided that will permit fluid sealing contact with the valve stem in a closing direction notwithstanding that the valve disc or closure member may actually seat at a lower level at one time than at another and consequently a variable axial seal movement is necessary in order to provide for such desirable flexibility in the backseating fluid sealing means.

It is therefore one of the more important objects of this invention to provide for a construction in which such flexibility in making the said axially variable backseating contact is provided in a relatively simple, economical, and durable manner.

Another important object is to provide for a construction in which such flexible axial seal movement is provided whereby a comparatively simple bellows may be used to simulate the resilient action of a spring and yet permit valve line fluid pressure to seal the backseating bushing to bear against the valve stem at a predetermined location thereon.

Other objects and advantages will become more readily apparent upon proceeding with a reading of the following specification, read in light of the accompanying drawings, in which.

Figures 1, 2:
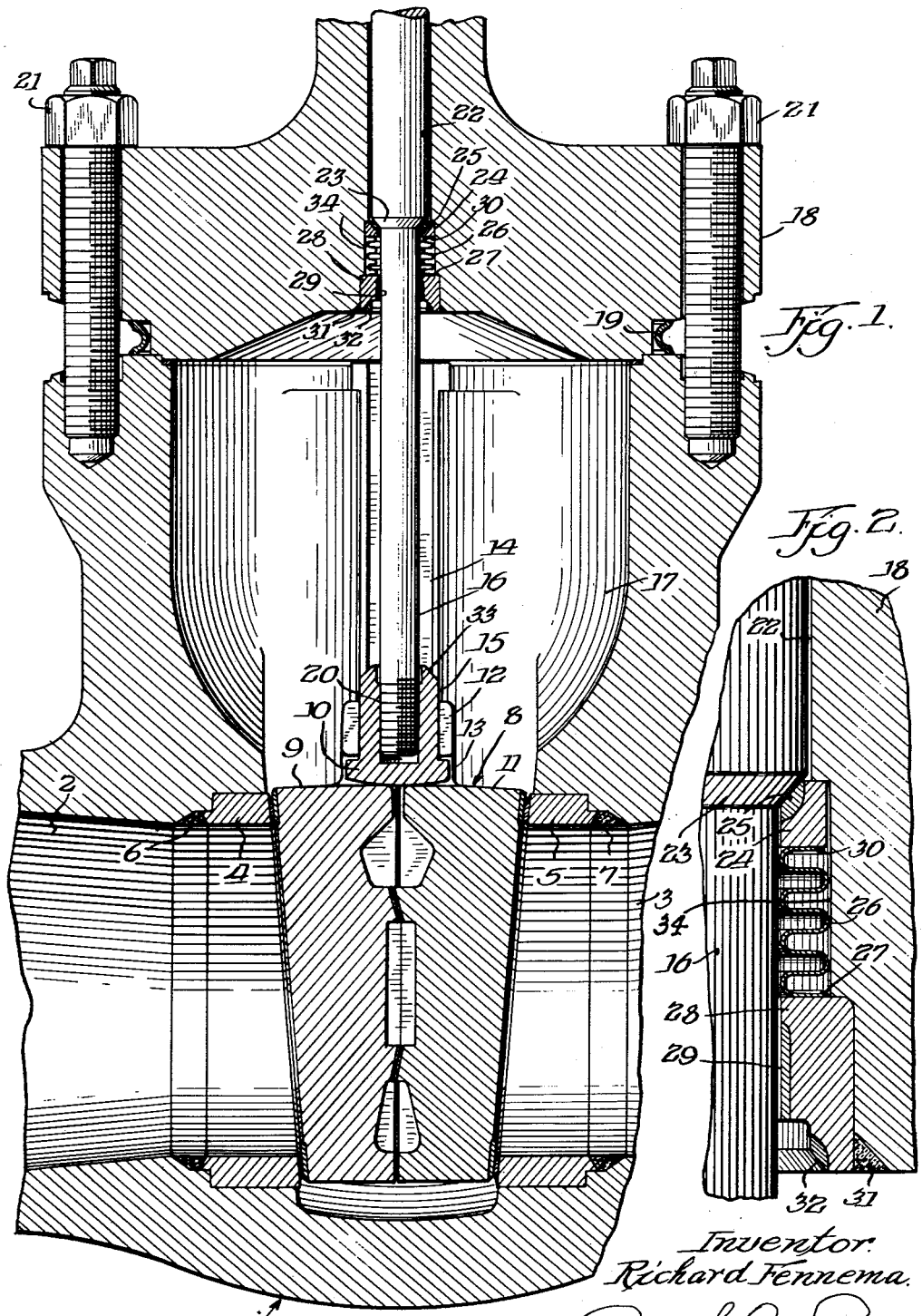
FIG. 1 is a fragmentary sectional assembly view of a valve embodying the sealing means of this invention.
FIG. 2 is a fragmentary magnified sectional view of the mechanism embodying the said invention.

Referring now to FIG. 1, a conventional gate valve construction of the type generally known as the wedge gate construction is illustrated employing the usual valve casing or body generally designated 1 having the usual inlet and outlet communicating passages oppositely disposed at 2 and 3 respectively and having the innermost portions of the said passages provided with the valve seats 4 and 5 weldably or otherwise secured as at 6 and 7 within the valve casing 1. Interrupting the said communication between the passages 2 and 3 is the gate valve disc or closure member generally designated 8 which for example and not of necessity is of the split disc construction and thereby comprises the complementary seating halves 9 and 11. At an upper portion each of said halves with what is termed a T-head 10 and recesses 12 and 13 respectively, provision is made of an actuating connection. The casing is preferably provided with the usual integral valve guides oppositely disposed at each side thereof as at 14, only one of which is shown. The T-head member 15 is attached as at 20 to the stem 16 and engages the T-head recesses at 12 and 13. A valve chamber 17 completes the interior of the casing 1 and provides the chamber within which the valve closure member 8 moves reciprocally in the course of its operation between the open and closed valve positions. It is shown in the closed position in FIG. 1.

Attached in any suitable manner, a conventional bonnet 18 is employed being arranged in fluid sealing arrangement relative to the casing 1 by means of the interposed gasket 19 and the annularly arranged bolts 21. The stem is, of course, suitably moved reciprocally to raise and close the closure member 8 by threaded means (not shown) and is preferably journaled as at 22 within the bonnet 18. At an upper portion of the said bonnet the usual stuffing box may also be provided which in this case is not shown.

Below the journaling portion 22 is provided the novel backseating arrangement which forms the subject matter of this invention, and it will further be noted that with the valve in the seated position illustrated the shouldered portion 23 of the stem bears against the annular seating member or bushing 24 which is limitedly movable axially and may be suitably faced with a hard bearing contact material such as 25 if desired. It will be apparent that the seating member 24 is thus flexibly mounted so as to be axially movable by means of a corrugated member such as the bellows 26 preferably sealed in any suitable fluid sealing manner at annular weld 27 to the base member 28 of annular configuration which is also preferably, but not necessarily, provided with a hardened interior bearing surface as at 29. Annular weld 30 maintains the bellows 26 in fluid sealing relationship to the member 24. It will also be further understood that the member 28 is fixedly held axially in position by means of an annular weld 31 attached to the under portion of the bonnet 18 as indicated.

The inner peripheral portion of the said base member 28 is suitably formed with an annular chamfered part 32 and thus shaped in such manner as to receive the chamfered portion 33 of the stem T-head member 15 when the valve is in the wide open position as distinguished from that illustrated in FIG. 1. It will be clear that the annular member 24 is flexibly mounted within the chamber defined by the annular surface 34 so that as wear in the valve closure mechanism occurs or seating dimension expansion takes place the valve stem and the closure member may move downwardly and yet permit of a fluid tight seal to be made while the valve is in a closed or seated position at 25. Line fluid pressure within the bellows entering from chamber 17 will also cause the latter member to be expanded outwardly to increase and thereby improve the bearing contact with the stem 16 at 23. The base member 28 thus completes the annular chamber 34 within which the bellows 26 and the annular member 24 are received.

It will be further understood that by virtue of such unusual flexibility as described the stuffing box, not shown, will be protected against the line fluids because of the seal remaining constant regardless of the variation in the phase of the valve closed position and the axial location of the stem contact surface 23. It will further be appreciated that the bellows 26 serves as a spring and thus it permits line fluid pressure to seal the backseating bushing member 24 against the annular chamfered surface 23 of the valve stem which in certain critical services constitutes a desirable provision.

It should also be clear that while only a single form of flexible sealing means has been shown and described, other means of producing the same result may be provided, as for example employing a coiled spring or other form of annularly arranged flexible element without departing from the spirit of this invention.

It is the desire, therefore, that this contribution be viewed in the light of its broad aspects as defined by the claims.

I claim:
1. In a backseating mechanism for a valve or the like, the combination of a reciprocally movable stem having an annular shouldered portion thereon, bonnet means with an opening for receiving said stem, the said opening being enlarged adjacent the shoulder portion of said stem, an annular seating bushing within said bonnet opening, the said bushing comprising upper and lower axially aligned annular portions in spaced apart relation to occupy said enlarged opening of the bonnet, the lower annular portion being fixedly mounted in said opening in annular fluid sealing relation to the said bonnet means, resilient pressure retaining means snugly fitted within said bonnet opening positioned around said stem between said upper and lower portions of said bushing and connected thereto, the upper annular portion of the said bushing being mounted on said resilient pressure retaining means in fluid sealing relation against said stem shouldered portion, the said pressure retaining means providing for the said upper annular portion of the said bushing being normally held against inner limits of the bonnet means opening and being axially movable in response to predetermined axial movement of the said stem.

2. In backseating means for a valve or the like, the combination of a reciprocally movable stem having an annular shouldered portion thereon, bonnet means with an opening for receiving said stem, the said opening being enlarged adjacent the shouldered portion of said stem, the said backseating means including a transversely divided annular collar within said bonnet opening comprising upper and lower annular portions in axially spaced apart relation, the lower annular portion being fixedly connected to said bonnet means mounted at a lower enlarged limit of said bonnet opening, corrugated fluid pressure retaining means relatively closely retained on its outer periphery within said bonnet opening and positioned around said stem between said upper and lower portions of said collar and connected thereto, the said lower annular portion being snugly received within said stem receiving opening, the upper annular portion of the said collar being carried by said corrugated resilient means on an upper annular portion thereof and bearing in fluid sealing relation against said stem shouldered portion and predeterminately against an opposite inner annular end limit of said bonnet opening, the said upper annular portion of the said collar also being axially movable in response to predetermined reciprocal movement of the said stem relative to said opposite end limits of the bonnet opening.

3. In backseating means for a valve or the like, the combination of a reciprocally movable valve stem having an intermediate annular shouldered portion thereon, bonnet means with an opening for receiving said stem, the said opening being enlarged adjacent the stem shouldered portion, the backseating means comprising a collar having upper and lower annular seating portions aligned in axially spaced apart relation in the stem receiving opening, the lower annular seating portion being fixedly mounted at a lower end of said bonnet opening, resilient enclosure means snugly fitted within said bonnet opening positioned around said stem between said upper and lower seating portions of said collar and connected thereto, the upper annular portion of the said collar being supported on said resilient means to bear against said stem shouldered portion in a valve closed position, the said upper annular portion of the said collar being axially movable in response to movement of the said stem when closing the valve, the bonnet opening having spaced apart annular shouldered portions respectively for receiving outer annular portions of said upper and lower annular seating portions, the upper seating portion having an upper annular tapered recessed surface bearing against the stem shouldered portion to align the latter portion when the valve is being seated, the lower seating portion having an undersurface bearing against a portion of the stem in the valve open position.

4. In backseating means for a valve or the like, the combination of a reciprocally movable valve stem having an intermediate annular shouldered portion and a lower end shouldered portion thereon, bonnet means with an opening for receiving said stem, the said opening being enlarged adjacent the lower end of said bonnet opening, the backseating means comprising a collar having upper and lower annular seating portions aligned in axially spaced apart relation in the stem receiving opening, the lower annular seating portion being fixedly mounted in fluid sealing relation to the bonnet means at a lower end of said bonnet opening, pressure retaining resilient means guided peripherally within said bonnet opening positioned around said stem between said upper and lower seating portions of said collar and connected thereto, the said resilient means being fixedly mounted to said upper and lower annular seating portions in fluid sealing relationship, the upper annular portion of the said collar being supported on said resilient means to bear against said intermediate stem shouldered portion in a valve closed position, the said upper annular portion of the said collar being snugly fitted within the bonnet opening and being axially movable slidably therewithin in response to movement of the said stem when closing the valve, the bonnet opening having spaced apart annular shouldered portions respectively for receiving outer annular portions of said upper and lower annular seating portions, the upper seating portion having an upper annular tapered recessed surface bearing against the intermediate stem shouldered portion in fluid sealing relation to align the latter stem portion when the valve is being closed, the lower seating portion having an undersurface bearing against a portion of the said stem lower end shouldered portion in the valve open position.

5. In backseating means for a valve or the like, the combination of a reciprocally movable valve stem having an intermediate annular shouldered portion thereon, bonnet means with an opening for receiving said stem, the said opening being enlarged adjacent the stem shouldered portion, the backseating means comprising a collar having intermediate annularly relieved portions comprising upper and lower annular seating end portions around the stem in axially spaced apart relation with annular seating surfaces on outer end portions thereof, the lower annular seating portion being fixedly mounted at a lower end of said bonnet opening, the said intermediate annularly relieved portions including fluid pressure retaining resilient enclosure means snugly fitted within said bonnet opening positioned around said stem between said upper and lower seating portions of said collar and connected in fluid sealing relation thereto, the upper annular portion of the said collar being supported on said resilient means to bear against said stem shouldered portion in a valve closed position, the said upper annular portion of the said collar being axially movable in response to movement of the said stem when closing the valve, the bonnet opening having spaced apart annular shouldered portions respectively for receiving said respective annular seating surfaces of said upper and lower annular seating end portions, the upper seating portion being supported on said resilient enclosure means and normally bearing against said stem annular shouldered portion, the said upper annular surface portion of the said backseating means being axially movable limitedly in response to predetermined axial movement of the said stem.

6. In backseating means for a valve or the like, the combination of a reciprocally movable valve stem having an intermediate annular shouldered portion thereon, bonnet means with an opening for receiving said stem, the said opening being enlarged adjacent the stem shouldered portion, the backseating means comprising a collar consisting of upper and lower annular bushing portions aligned in axially spaced apart relation in the stem receiving opening, the lower annular seating portion being fixedly mounted at a lower end of said bonnet opening in fluid sealing relation thereto, resilient fluid pressure retaining expandible and contractible enclosure means snugly fitted within said bonnet opening positioned around said stem linking said upper and lower bushing portions of said collar and connected thereto in fluid sealing relation, the upper annular portion of the said collar being supported on said resilient means and closely guided within the enlarged bonnet opening, the said upper annular portion having an annular tapered surface bearing in fluid sealing relation against said stem shouldered portion in a valve closed position whereby to axially align the said stem with the upper annular bushing when the valve is being seated, the said upper annular bushing portion of the said collar being axially movable in and biased in response to axial movement of the said stem in a valve closing direction by said expandible and contractible enclosure means, the said bonnet enlarged opening being defined at end limits thereof by spaced apart annular shouldered portions respectively for receiving annular surface portions of said upper and lower annular bushing portions.

7. In backseating means for a valve or the like, the combination of a reciprocally movable stem having thereon an annular shouldered median portion, bonnet means with an opening for receiving said stem, the said opening being enlarged adjacent the said stem shouldered portion, the backseating means including a plurality of superposed axially aligned seat bushings of unlike diameters snugly fitted within said bonnet opening, the said bushings consisting of upper and lower annular portions in axially spaced apart relation, the lower one of the bushings at a lower peripheral portion thereof being fluid sealed and being fixedly mounted relative to said bonnet means, fluid pressure retaining resilient flexible wall means snugly fitted within said bonnet opening and positioned in fluid tight relation to said upper and lower portions respectively of said bushings, the upper one of the said bushings being positioned on said resilient flexible wall means and bearing predeterminately in fluid sealing relation against a substantially transverse upper surface of said enlarged bonnet opening and also against a lower end of said stem shouldered median portion simultaneously, the said upper bushing being axially movable against the said resilient flexible wall means in a valve closed position to predeterminately compress said resilient flexible wall means.

References Cited in the file of this patent

UNITED STATES PATENTS

| 667,797 | Scott | Feb. 12, 1901 |
| 2,543,102 | Franck | Feb. 27, 1951 |

FOREIGN PATENTS

| 514,883 | Canada | of 1955 |